(12) United States Patent  
Säfsten et al.

(10) Patent No.: US 9,174,214 B2  
(45) Date of Patent: *Nov. 3, 2015

(54) METHOD OF COUPLING BINDING AGENTS TO A SUBSTRATE SURFACE

(75) Inventors: Pär Säfsten, Uppsala (SE); Mattias Tidare, Uppsala (SE)

(73) Assignee: GE HEALTHCARE BIO-SCIENCES AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,621

(22) Filed: Oct. 8, 2009

(65) Prior Publication Data

US 2010/0029015 A1    Feb. 4, 2010

Related U.S. Application Data

(63) Continuation of application No. 10/449,823, filed on May 30, 2003, now abandoned.

(60) Provisional application No. 60/384,626, filed on May 31, 2002.

(30) Foreign Application Priority Data

May 31, 2002    (SE) .................................. 0201637-6

(51) Int. Cl.
*B05D 5/00*    (2006.01)
*B01L 3/00*    (2006.01)
(Continued)

(52) U.S. Cl.
CPC ....... *B01L 3/502776* (2013.01); *B01J 19/0046* (2013.01); *B82Y 30/00* (2013.01); *B01J 2219/0059* (2013.01); *B01J 2219/0074* (2013.01); *B01J 2219/00286* (2013.01); *B01J 2219/00353* (2013.01); *B01J 2219/00511* (2013.01); *B01J 2219/00527* (2013.01); *B01J 2219/00585* (2013.01);
(Continued)

(58) Field of Classification Search
CPC .......................... B01L 3/502776; B82Y 35/00
USPC ................... 427/301, 333, 337, 399
See application file for complete search history.

(56) References Cited

U.S. PATENT DOCUMENTS 5,242,828 A    9/1993    Bergstrom et al.
5,313,264 A    5/1994    Ivarsson et al.
(Continued)

FOREIGN PATENT DOCUMENTS

WO    WO 90/05305    5/1990
WO    WO 97/01087    1/1997
(Continued)

*Primary Examiner* — Elena T Lightfoot
(74) *Attorney, Agent, or Firm* — Sutherland Asbill & Brennan LLP

(57) ABSTRACT

The present invention relates to a method of coupling multiple binding agents to respective areas of a substrate surface by hydrodynamic addressing, using two laminar fluid flows that flow together in the same direction over the substrate surface with an interface to each other to successively couple the binding agents to the substrate areas, wherein each successive coupling of a binding agent to a surface area is followed or preceded by selective deactivation or activation of a selected surface area according to a defined protocol. The invention also relates to the use of such a binding agent-coupled substrate surface for analytical purposes.

20 Claims, 3 Drawing Sheets

(51) Int. Cl.
  *B01J 19/00* (2006.01)
  *B82Y 30/00* (2011.01)
  *C40B 40/10* (2006.01)

(52) U.S. Cl.
  CPC ............ *B01J 2219/00596* (2013.01); *B01J 2219/00605* (2013.01); *B01J 2219/00617* (2013.01); *B01J 2219/00626* (2013.01); *B01J 2219/00637* (2013.01); *B01J 2219/00657* (2013.01); *B01J 2219/00659* (2013.01); *B01J 2219/00677* (2013.01); *B01J 2219/00689* (2013.01); *B01J 2219/00704* (2013.01); *B01J 2219/00725* (2013.01); *B01L 2200/0636* (2013.01); *B01L 2300/0636* (2013.01); *B01L 2300/0877* (2013.01); *C40B 40/10* (2013.01)

(56) References Cited

U.S. PATENT DOCUMENTS

| | | |
|---|---|---|
| 5,436,161 A | 7/1995 | Bergstrom et al. |
| 6,200,814 B1 | 3/2001 | Malmqvist et al. |
| 2003/0022388 A1 | 1/2003 | Roos et al. |

FOREIGN PATENT DOCUMENTS

| | | |
|---|---|---|
| WO | WO 99/36766 | 7/1999 |
| WO | WO 00/56444 | 9/2000 |

METHOD OF COUPLING BINDING AGENTS TO A SUBSTRATE SURFACE

CROSS-REFERENCE TO RELATED APPLICATION

This application is a continuation of U.S. patent application Ser. No. 10/449,823, filed May 30, 2003, abandoned, which claims the benefit of U.S. Provisional Application No. 60/384,626 filed May 31, 2002, and Swedish Patent Application No. 0201637-6 filed May 31, 2002, both of which applications are incorporated herein by reference in their entireties.

BACKGROUND OF THE INVENTION

1. Field of the Invention

The present invention relates to a method of coupling binding agents to a substrate surface by passing a binding agent-containing fluid flow over the surface, and more particularly by using hydrodynamic addressing techniques to selectively direct fluid flows to desired surface areas. The invention also relates to analytical use of the method.

2. Description of the Related Art

Flow cells are used extensively nowadays in a variety of analytical systems. Typically, the flow cell has an inlet opening, a flow channel with a sensing surface, and an outlet opening. A sample fluid to be investigated is introduced through the inlet opening, passes through the flow channel and leaves the flow cell through the outlet opening. The flow cell may have more than one inlet opening and optionally more than one outlet opening to permit desired manipulations of the flow pattern within the flow cell.

The sensing surface usually comprises a substance layer to which a recognition element for an analyte in the sample is immobilised, typically a biochemical affinity partner to the analyte. When the analyte interacts with the recognition element, a physical or chemical change is produced on the sensing surface that can be detected by a detector, e.g., an optical, electrochemical or calorimetric detector. A flow channel may contain two or more sensing surfaces with different recognition elements.

The sensing surface or surfaces in the flow cell may be functionalized, or sensitized, in situ, i.e., within the flow cell. WO 90/05305 discloses a method for functionalising a sensing surface having functional groups thereon by passing a reagent solution containing a bi- or polyfunctional ligand over the surface, the ligand having a function which immobilizes the ligand on the sensing surface and at least one more function which is exposed on the sensing surface for interaction with the analyte. In a specific embodiment, the sensing surface has a bound carboxymethyl-dextran layer. After activation of the surface through derivatization with N-hydroxysuccinimide, mediated by N-ethyl-N'-(dimethylaminopropyl)carbodiimide, a ligand in the form of aminotheophylline or aminobiotin is coupled to the activated surface.

WO 99/36766 discloses methods and systems using hydrodynamic addressing techniques to allow immobilization of different ligands to discrete sensing areas within a single flow cell channel, as well as to permit controlled sample delivery to such sensitized areas. For a Y-type flow cell, which has an inlet end with two inlet ports and an outlet end with one outlet port, and a sensing surface between the ends, WO 99/36766 describes sensitization of two spaced apart sensing areas with different ligands. This is done by providing a laminar flow of a sensitising fluid adjacent to a laminar flow of non-sensitizing (blocking) fluid such that the fluids flow together over the sensing surface with an interface to each other. By adjustment of the relative flow rates of the two fluids the interface may be positioned laterally such that sensitising fluid selectively contacts a desired area of the sensing surface. More specifically, if the sensitizing fluid initially contains a first ligand capable of binding to the sensing surface and the interface is positioned such that the sensitizing fluid covers, say, about one third of the lateral extension of the sensing surface, and the blocking fluid covers the remaining two thirds, the first ligand will be immobilized to the first-mentioned third of the sensing surface. Then, the sensitizing fluid is replaced by blocking fluid, and the blocking fluid is replaced by a sensitizing fluid containing a second ligand. By positioning the interface such that the sensitizing fluid again covers about one third of the lateral extension of the sensing surface, now, however, at the opposite side of the flow path, the second ligand will be immobilized to that area, thereby providing a sensing surface which, as seen laterally, has about one third immobilized with the first ligand, about one third immobilized with the second ligand, and an intermediate non-immobilized third which only has been in contact with blocking fluid and may suitably be used as a reference area.

For providing more than two differently sensitized sensing surface areas, WO 99/36766 discloses the use of a so-called ψ-type flow cell having three inlets and a single outlet. In this embodiment, a laminar flow of sensitizing fluid is sandwiched between two laminar flows of blocking fluid, and the sensitizing fluid may thereby be displaced laterally to selectively contact a number of sensing surface areas.

A similar use of a ψ-type flow cell is disclosed in WO 00/56444.

While the ψ-type flow cell is advantageous in comparison with the Y-type flow cell in that the former readily permits sensitization with more than two different ligands, the ψ-type flow cell requires the use of an additional pump (one pump for each fluid flow inlet), which considerably complicates the control of the different laminar flows. It would therefore be desired to be able to use a Y-type flow cell to sensitize a sensing surface with more than two different ligands.

Accordingly, it is an object of the present invention to provide a method which permits coupling of multiple different ligands, or generally binding agents, to respective surface areas by hydrodynamic addressing using only two adjacent laminar fluid flows, such as e.g., in a Y-type flow cell.

BRIEF SUMMARY OF THE INVENTION

The above and other objects and advantages are obtained by a novel method of coupling multiple binding agents to respective areas of a substrate surface by hydrodynamic addressing, wherein each successive coupling of a binding agent to a substrate area is followed or preceded by selective deactivation or activation of a selected surface area or areas according to a particular coupling protocol.

In one aspect, the present invention provides a method of coupling at least two different binding agents to respective defined areas of a substrate surface by hydrodynamic addressing based on two laminar fluid flows that flow together in the same direction over the substrate surface with an interface to each other, and selectively contacting a defined area of the substrate surface with a desired fluid by positioning the interface laterally through adjustment of the relative flow rates of the two fluid flows, which method comprises at least one of hydrodynamic addressing procedures A and B, wherein procedure A comprises immobilizing a first binding agent to a first area of the substrate surface by contacting the area with a fluid containing the first binding agent, deactivating the first area by subjecting the area to a deactivating fluid, and immobilizing a second binding agent to a second area of the substrate surface by contacting a substrate surface area including the first and second areas with the second binding agent; and procedure B comprises deactivating a first area of the substrate surface by subjecting the area to a deactivating fluid, immobilizing a first binding agent to a second area of the substrate surface by contacting the first and second areas with a fluid containing the first binding agent, activating at least a part of the first area by subjecting the area to an activating fluid, and immobilizing a second binding agent to the first area by contacting the first area with a fluid containing the second binding agent.

In one embodiment, the method comprises the steps of:

a) providing a substrate surface, at least a part of which is reactive (e.g., activated) to permit coupling of binding agents thereto;

b) passing over the substrate surface a laminar flow of a fluid containing a first binding agent, and adjacent thereto a laminar flow of a blocking fluid that does not interact with the substrate surface such that the two fluids flow together in the same direction with an interface to each other, and adjusting the relative flow rates of the two laminar fluid flows to position the interface such that the first binding agent-containing fluid selectively contacts a first reactive (e.g., activated) area of the substrate surface to couple the first binding agent thereto;

c) replacing the flow of the first binding agent-containing fluid with a laminar flow of a deactivating fluid, and adjusting the relative flow rates of the two laminar fluid flows to position or displace the interface laterally such that the deactivating fluid selectively contacts at least the first binding agent-coupled area but less than the whole activated surface area for deactivation thereof;

d) replacing the flow of the deactivating fluid with a laminar flow of a fluid containing a second binding agent, and adjusting the relative flow rates of the two laminar fluid flows to displace the interface laterally such that the second binding agent-containing fluid selectively contacts the deactivated area and an adjacent second reactive (e.g., activated) area of the substrate surface to selectively couple the second binding agent to the second area; and, optionally, e) replacing the flow of the second binding agent-containing fluid with a laminar flow of deactivating fluid, and adjusting the relative flow rates of the two laminar flows to position or displace the interface laterally such that the deactivating fluid selectively contacts at least the deactivated area and the second binding agent-coupled area of the substrate surface for deactivation thereof.

Another embodiment of the method comprises the steps of:

a) providing a substrate surface, at least part of which is reactive to permit coupling of binding agents thereto;

b) passing over the substrate surface a laminar flow of a deactivating fluid, and adjacent thereto a laminar flow of a blocking fluid that does not interact with the substrate surface, such that the two fluids flow together in the same direction with an interface to each other, and adjusting the relative flow rates of the two laminar fluid flows to position the interface such that the deactivating fluid selectively contacts a first reactive area of the substrate surface for deactivation thereof;

c) replacing the flow of the deactivating fluid with a laminar flow of a fluid containing a first binding agent, and adjusting the relative flow rates of the two laminar fluid flows to displace the interface laterally such that the first binding agent-containing fluid selectively contacts the deactivated area and an adjacent second reactive area of the substrate surface to selectively couple the first binding agent to the second area;

d) replacing the flow of the first binding agent-containing fluid with a laminar flow of activating fluid, and adjusting the relative flow rates of the two laminar fluid flows to displace the interface laterally such that the activating fluid selectively contacts at least a part of the deactivated first area for activation thereof; and e) replacing the flow of the activating fluid with a laminar flow of a fluid containing a second binding agent, and adjusting the relative flow rates of the two laminar fluid flows to position or displace the interface laterally such that the second binding agent-containing fluid selectively contacts the activated first area to selectively couple the second binding agent thereto.

Optionally, combinations of the above two method embodiments may also be used.

In another aspect, the present invention provides the use of the method for analysing a fluid sample for the presence of at least one analyte.

In still another aspect, the present invention provides the use of the method for studying interactions of at least one analyte with the substrate surface.

In yet another aspect, the present invention provides a computer program product comprising program code means stored on a computer readable medium or carried on an electrical or optical signal for performing the method.

These and other aspects of this invention will be evident upon reference to the attached drawings and the following detailed description.

DETAILED DESCRIPTION OF THE INVENTION

Figure 1:
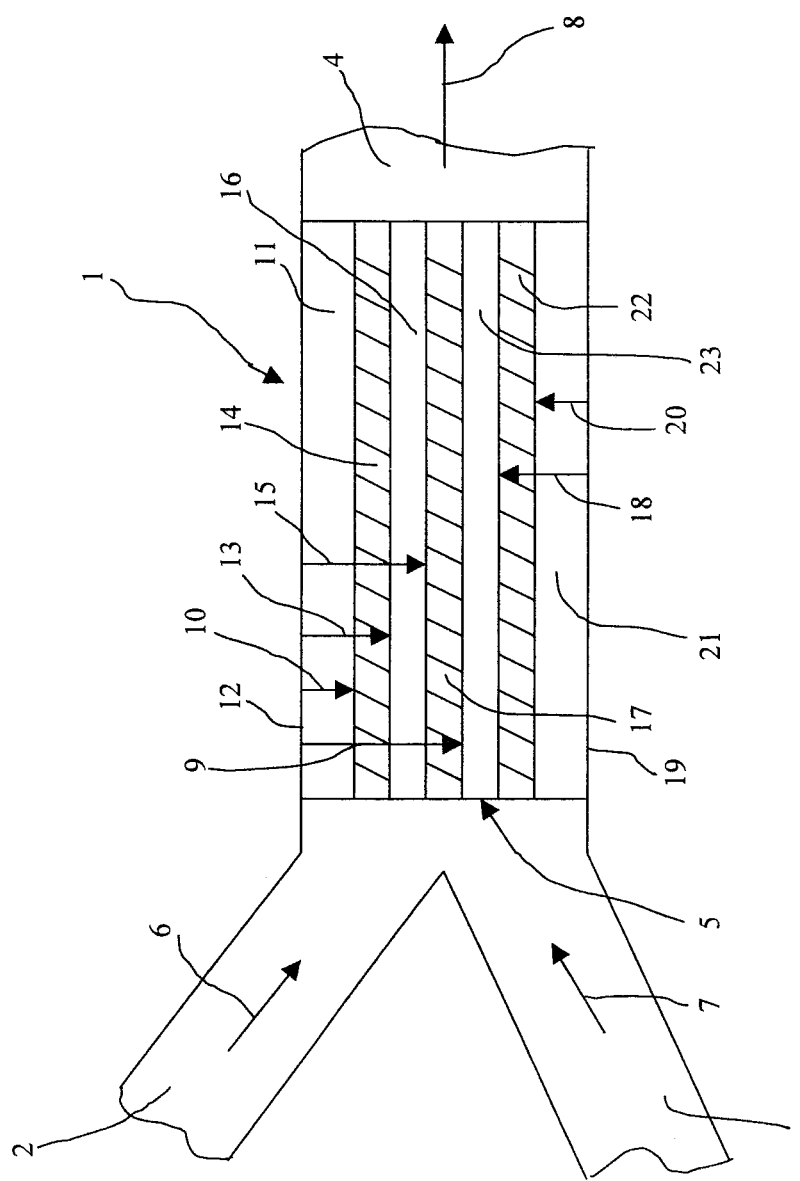
FIG. 1 is a schematic illustration of an embodiment of the method of the present invention using a Y-type flow cell.

As mentioned above, the present invention is generally directed to the coupling of multiple binding agents to a substrate (solid support) surface using hydrodynamic addressing techniques to successively bring binding agent-containing fluid flows into selective contact with different surface areas to couple the different binding agents thereto. More particularly, two adjacent laminar fluid flows are provided which flow together over the substrate surface with an interface between them, as described in the aforementioned WO 99/36766 (the entire disclosure of which is incorporated by reference herein).

By adjusting the relative flow rates of the two fluid flows, the interface may be positioned laterally to make the different fluids contact respective desired areas of the substrate surface. To couple a binding agent to the substrate surface, one of the fluid flows contains a binding agent, and the other fluid flow is one that can not interact with the substrate surface, below frequently referred to as a blocking fluid. To permit coupling of the binding agent to the substrate surface, the surface should, of course, be sufficiently reactive towards the binding agent. Preferably, the surface is activated by an activating agent as is per se well known in the art.

According to the present invention, a binding agent may be coupled to a (preferably activated) surface followed by selective deactivation of the coupled surface area, and optionally of an adjacent area but less than the whole activated surface, and a different binding agent is then coupled to an adjacent activated surface area, followed by deactivation of the activated surface area. By proceeding in this manner with successive coupling of binding agents with deactivation after each coupling, multiple binding agents may readily be coupled to respective areas of an activated substrate surface, if desired with non-coupled areas between the coupled areas.

Optionally, the procedure may start with deactivating an edge area of the activated substrate surface, and a binding agent is then coupled to an activated area adjacent to the deactivated edge area.

While it is possible to carry out the coupling procedure of the invention from one side of the flow path to the other, it may be convenient to start from one side and successively couple a first number of binding agents, and then shift to the opposite side of the flow path and successively couple a second number of binding agents from that side. In this case, activation of the surface area to be coupled with this second number of agents may take place after coupling the first number of binding agents.

Alternatively, a binding agent may be coupled to a (preferably activated) surface by selective deactivation of a part of the activated substrate surface, coupling of a binding agent to the remaining activated area, reactivation of at least a part of the deactivated area, and coupling of a different binding agent to the reactivated area. By proceeding in this way with successive activation and deactivation before each coupling of binding agent, multiple binding agents may be immobilized to respective areas of an activated surface.

Optionally, a pre-activated surface may be used instead of activating the surface areas at the time of coupling the binding agents.

It is not necessary that all the binding agents coupled to the substrate surface be different. However, usually at least two adjacent binding agent coupled areas should not support the same binding agent.

Preferably, at least one surface area is not coupled with binding agent and used as a reference area(s).

The term "binding agent" as used herein means any agent that is a member of a specific binding pair, including, for instance polypeptides, such as, e.g., proteins or fragments thereof, including antibodies; nucleic acids, e.g., oligonucleotides, polynucleotides, and the like; etc. The binding agent is often a ligand.

The term "ligand" as used herein means a molecule that has a known or unknown affinity for a given analyte and can be immobilized on a predefined region of the surface. The ligand may be a naturally occurring molecule or one that has been synthesized. The ligand may be used per se or as aggregates with another species. Optionally, the ligand may also be a cell.

The term "reactive" with respect to a substrate surface means that the surface should exhibit a binding moiety, such as e.g., a functional group, capable of coupling to a binding agent.

The term "activation" means modification of a substrate surface to enable coupling a binding agent thereto, usually modification of a functional group on the substrate surface.

The term "deactivation" means modification of a reactive substrate surface, usually of an activated functional group thereon, such that coupling of a binding agent to the surface is substantially prevented. Deactivation may include restoring an original functional group or making a reactive functional group or other reactive moiety inactive in other ways.

Activating and deactivating agents that may be used for the purposes of the present invention are per se well known to a person skilled in the art and may readily be selected for each particular situation.

The choice of activating agent (and method) depends, of course, on the functional group to be activated and on the desired reactive group to be obtained by the activation, which in turn depends on the binding agent to be coupled to the substrate surface. Exemplary functional group/activating agent combinations include those introducing hydroxysuccinimide esters, nitro- and dinitrophenyl esters, tosylates, mesylates, triflates and disulfides. For example, a hydroxy group may be reacted to activated ester with disuccinic carbonate, or to epoxide with a diepoxide. A carboxy group may be activated to N-hydroxysuccinimide ester by reaction with N-hydroxysuccinimide (NHS) and carbodiimide, e.g., 1-[3-dimethylamino)propyl]-3-ethylcarbodiimide (EDC), or to dinitrophenyl ester by reaction with dinitrophenol. A thiol (mercapto) group may be activated to a disulfide group by reaction with e.g., a dipyridyldisulfide or (2-pyridinyldithio) ethaneamine.

For example, NHS/EDC activation of carboxy groups may be used to couple binding agents having an amine function (so-called amine coupling) or an aldehyde function (so-called aldehyde coupling).

NHS/EDC activation may also be used to introduce thiol groups, e.g., by reaction with dithioerythritol (DTE). These thiol groups may then either (i) be reacted with an active disulfide group of a binding agent (so-called surface thiol coupling), or (ii) be activated to disulfide groups which may be reacted with a thiol function of a binding agent (so-called ligand thiol coupling).

Also avidin or streptavidin may be coupled to an NHS/EDC-activated surface to permit capture of a biotinylated binding agent (so-called avidin coupling).

The choice of deactivating agent depends, of course, on the active group(s) to be deactivated. For example, N-hydroxysuccinimide esters may be deactivated with ethanolamine or sodium hydroxide, deactivation with sodium hydroxide being reversible, i.e., the deactivated surface may be reactivated by activation with an activating agent.

The term "coupling" as used herein is to be interpreted in a broad sense and includes covalent binding as well as other types of binding.

The method of the invention is preferably performed in a flow cell. Suitable flow cells for use in the present invention may assume a number of forms, the design of which may vary widely. A preferred type of flow cell is the "Y-flow cell" which has two inlets and one outlet and which is described in, for example, the above-mentioned WO 99/36766.

The substrate surface is usually a sensing surface, which term in the present context is to be construed broadly. The sensing surface may, for example, be a surface or surface layer that can interact specifically with a species present in a fluid, a surface or surface layer that can be chemically or physically sensitised to permit such interaction, or a surface or surface layer that can be chemically or physically activated to permit sensitisation thereof. A flow cell may contain one or more sensing surfaces.

Binding events at the sensing surface may be detected by numerous techniques. In many cases it is favourable to use so-called non-label methods. Representative such detection methods include, but are not limited to, mass detection methods, such as piezoelectric, optical, thermo-optical and surface acoustic wave (SAW) device methods, and electrochemical methods, such as potentiometric, conductometric, amperometric and capacitance/impedance methods. With regard to optical detection methods, representative methods include those that detect mass surface concentration, such as reflection-optical methods, including both external and internal reflection methods, angle, wavelength, polarization, or phase resolved, for example evanescent wave ellipsometry and evanescent wave spectroscopy (EWS, or internal reflection spectroscopy), both may include evanescent field enhancement via surface plasmon resonance (SPR), Brewster angle refractometry, critical angle refractometry, frustrated total reflection (FTR), scattered total internal reflection (STIR), which may include scatter enhancing labels, optical wave guide sensors; external reflection imaging, evanescent wave-based imaging such as critical angle resolved imaging, Brewster angle resolved imaging, SPR-angle resolved imaging, and the like. Further, photometric and imaging/microscopy methods, "per se" or combined with reflection methods, based on for example surface enhanced Raman spectroscopy (SERS), surface enhanced resonance Raman spectroscopy (SERRS), evanescent wave fluorescence (TFRF) and phosphorescence may be mentioned, as well as waveguide interferometers, waveguide leaking mode spectroscopy, reflective interference spectroscopy (RIfS), transmission interferometry, holographic spectroscopy, and atomic force microscopy (AFR).

SPR spectroscopy may be mentioned as an exemplary commercially available analytical system to which the present invention may be applied. One type of SPR-based biosensors is sold by Biacore AB (Uppsala, Sweden) under the trade name BIACORE®. These biosensors utilize a SPR based mass-sensing technique to provide a "real-time" binding interaction analysis between a surface bound ligand and an analyte of interest.

The basic principles of the invention will now be further described with reference to FIG. 1. A Y-type flow cell, generally designated by reference numeral 1, has two inlets 2 and 3, respectively, and an outlet 4. The flow cell has a sensing surface 5 on a wall portion thereof. The sensing surface may, for example, be of the type described in U.S. Pat. Nos. 5,242,828 and 5,436,161 (the full disclosures of which are incorporated by reference herein) and may, for instance, include a matrix coating in the form of carboxymethylated dextran.

A laminar flow of a first fluid, indicated by arrow 6, is introduced through inlet 2, and a laminar flow of a second fluid, indicated by arrow 7, is introduced through inlet 3 such that the two fluids flow together over the sensing surface 5 with an interface (not shown) between them, exiting through outlet 4, as indicated by arrow 8. By adjusting the relative flow rates of the two fluid flows, the position of the interface may be displaced laterally as desired and be set at any distance from either side wall of the flow cell. Immobilization of three different ligands to the sensing surface 5 is performed as described in steps (1) to (10) below. Reference is simultaneously made to FIG. 2, which schematically illustrates the procedure. Each square in FIG. 2 represents a Y-cell, as shown in FIG. 1, with the respective process step number indicated at the top thereof.

(1) The procedure is started with the first fluid 6 being a fluid containing an activating agent, and the second fluid 7 being a blocking fluid (i.e., one that does not affect or interact with the sensing surface), such as buffer. The interface between the two fluid flows is positioned such that the activating fluid selectively covers a sensing surface area which, in the illustrated case, extends over more than half the lateral extension of the sensing surface as indicated by arrow 9. If the sensing surface 5 includes a layer of carboxymethylated dextran as suggested above, the activating agent may be N-hydroxysuccinimide (NHS) together with N-ethyl-N'-(dimethylaminopropyl)-carbodiimide (EDC). It is, alternatively, possible to activate the whole sensing surface by replacing the two fluid flows by a single flow of activating fluid.

(2) The activating fluid is then replaced by a fluid containing a deactivating agent, and the interface between the two fluid flows 6, 7 is positioned at the point of arrow 10, such that the deactivating fluid selectively covers an area 11 close to the flow cell wall 12, the buffer fluid covering the rest of the sensing surface 5. The area 11 will thereby be deactivated so as not to react with ligand-containing fluid in the following step. If NHS/EDC is used as activating agent, the deactivating agent may, for example, be ethanolamine.

(3) The deactivating fluid 6 is then replaced by a fluid containing a first ligand, e.g., a first monoclonal antibody, and the interface between the two fluid flows 6, 7 is positioned at the point of arrow 13, such that the ligand-containing fluid selectively covers the deactivated area 11 as well as an adjacent activated area 14. The area 14 will thereby have the first ligand coupled thereto.

(4) The ligand-containing fluid 6 is then replaced by deactivating fluid, and the interface between the two fluid flows 6, 7 is positioned at the point of arrow 15, such that the deactivating fluid selectively covers areas 11, 14 and an adjacent activated area 16 which will thereby be deactivated.

(5) The deactivating fluid 6 is then replaced by a fluid containing a second ligand, e.g., a second monoclonal antibody, and the interface between the two fluid flows 6, 7 is positioned at the point of arrow 9, such that the ligand-containing fluid covers areas 11, 14, 16 and an adjacent activated area 17 extending between the points of arrows 9 and 15. The area 17 will thereby have the second ligand coupled thereto.

(6) The ligand-containing fluid 6 is then replaced by a deactivating fluid, and the interface between the two fluid flows 6, 7 is positioned at the point of arrow 9, such that the deactivating fluid covers areas 11, 14, 16 and 17 which will thereby be deactivated.

(7) The ligand-containing fluid 6, introduced through inlet 2, is then replaced by buffer, and the buffer flow 7, introduced through inlet 3, is replaced by activating fluid. The interface between the two fluid flows 6, 7 is positioned such that the activating fluid selectively covers an area extending as indicated by arrow 18, i.e., from the flow cell wall 19 towards but not up to the ligand-coupled area 17.

(8) The activating fluid 7 is then replaced by deactivating fluid, and the interface between the two fluid flows 6, 7 is positioned at the point of arrow 20 such that the deactivating fluid selectively covers an activated area 21 close to the flow cell wall 19 which area is thereby deactivated.

(9) The deactivating fluid 7 is then replaced by a fluid containing a third ligand, e.g., a third monoclonal antibody, and the interface between the two fluid flows 6, 7 is positioned at the point of arrow 19, such that the ligand-containing fluid covers the area 21 and an adjacent activated area 22 extending between the points of arrows 18 and 20. This area 22 will thereby have the third ligand coupled thereto.

(10) Finally, the ligand-containing fluid 7 is replaced by deactivating fluid, and the interface between the two fluid flows 6, 7 is positioned at the point of arrow 9 such that the deactivating fluid 7 selectively covers the deactivated area 21, the ligand-coupled area 22 and (in the illustrated case) a non-activated area 23 between the ligand-coupled areas 22 and 17 for deactivation thereof. (Alternatively, the deactivating fluid may only cover the areas 21 and 22).

The sensing surface 5 now exhibits three discrete sensing areas 14, 17 and 22, each supporting a different ligand, which sensing areas are separated mutually as well as to the flow cell walls 12, 19 by deactivated areas 11, 16, 21 and 23. The resulting Y-cell with the desired sensitized sensing surface is also shown in FIG. 2, to the right of the step 10 Y-cell.

While in the above illustrated case three discrete areas have been immobilised with ligand, it is understood that by proceeding as described above with successive ligand-coupling and deactivation steps, from e.g., four, five or six to considerably more ligand-coupled areas may likewise readily be produced on a sensing surface, depending on among other things the flow cell, the size of the sensing surface, the precision and control of pumps, etc.

In the above described immobilisation procedure, the different sensing surface areas are immobilised from the edges of the surface towards the centre. This requires, however, that ligands have to be contacted with areas to which a ligand has already been immobilised. This may be avoided by a procedure in which the ligands are immobilised to the respective areas from the centre towards the edges. An embodiment of such a procedure is outlined below with reference to FIG. 3.

Figure 2:
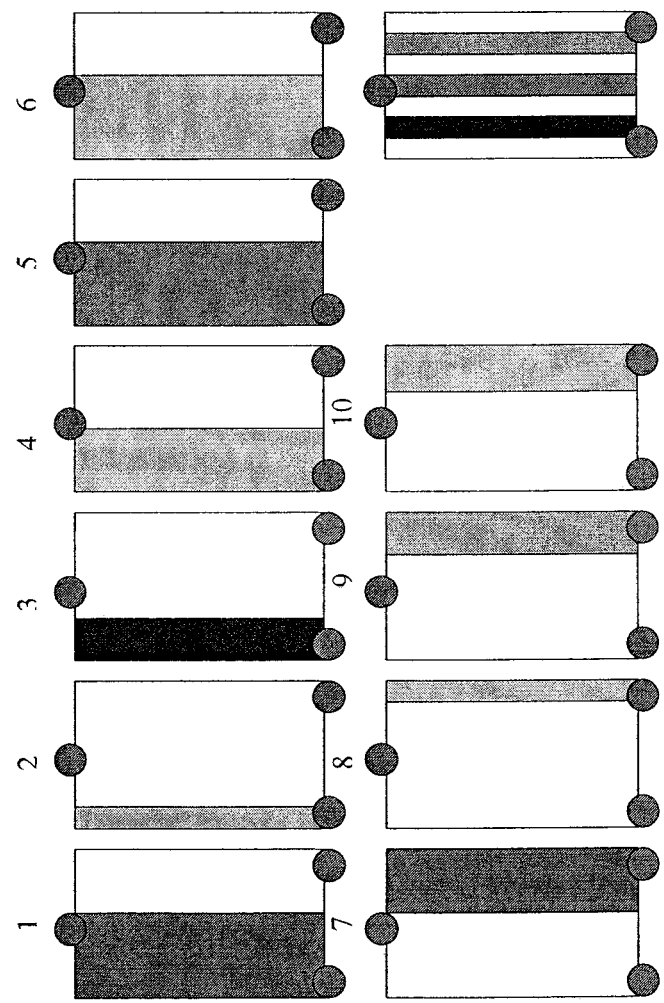
FIG. 2 is a schematic illustration of the different steps in the method relating to FIG. 1.
Figure 3:
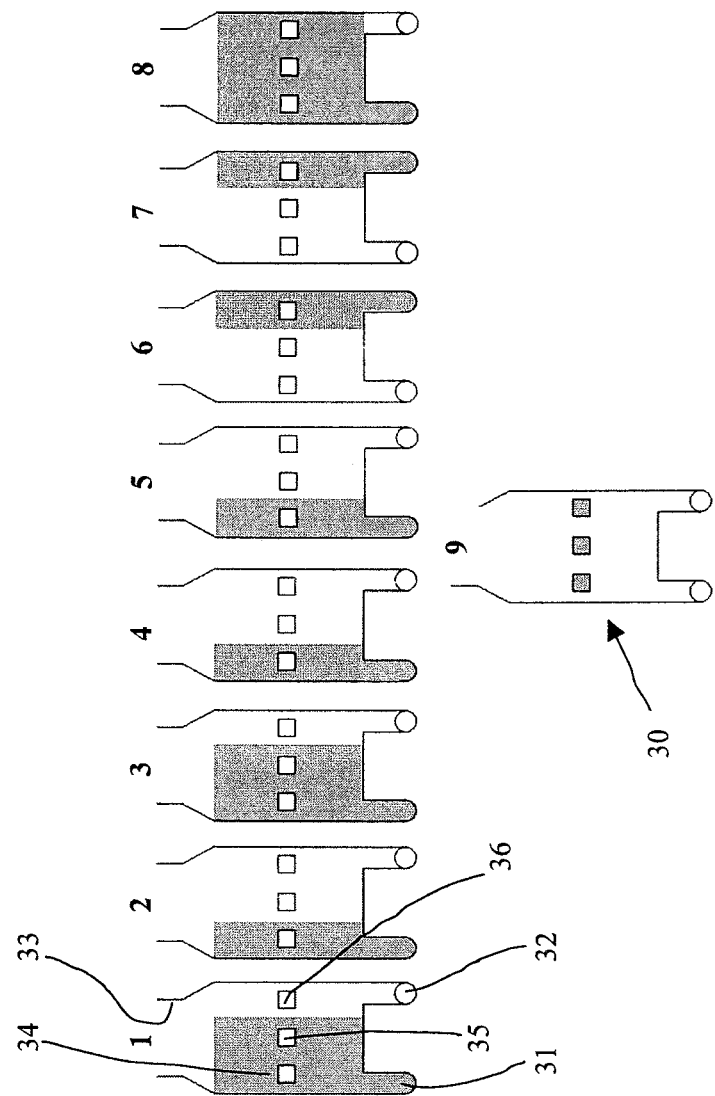
FIG. 3 is a schematic illustration of another method embodiment of the present invention using a Y-type flow cell.

In FIG. 3, the flow cell 30 is a Y-cell similar to that shown in FIGS. 1 and 2, having two inlets 31, 32, an outlet 33 and a sensing surface on a wall portion thereof (not specifically indicated). Three detection spots, i.e., areas on the sensing surface that are measured by a detection system (not shown) are indicated at 34, 35 and 36. A number of images of flow cell 30, numbered from 1 to 9, are shown to illustrate the different steps of the procedure. The sensing surface may e.g., be carboxymethylated dextran, the activating fluid may be an NHD/EDC-solution, deactivating fluids may be sodium hydroxide solution and ethanolamine solution, and the blocking fluid buffer.

(1) The procedure is started by passing a laminar flow of activating fluid through inlet 31 and blocking fluid through inlet 32. In the illustrated case, the interface between the two fluid flows is positioned such that the activating fluid covers detection spots 34 and 35 (i.e., two thirds of the lateral extension of the sensing surface).

(2) The activating fluid is then replaced by deactivating fluid, and the interface is positioned such that the deactivating fluid covers detection spot 34 (i.e., the left third of the sensing surface) to deactivate that part of the activated surface area, leaving the centre area that includes detection spot 35 activated. The deactivating fluid is selected such that the deactivated area may later be reactivated (e.g., sodium hydroxide as mentioned above).

(3) The deactivating fluid is then replaced by a fluid containing a first ligand, and the interface is positioned such that the ligand-containing fluid covers detection spots 34 and 35, i.e., the same area as that activated in step (1) above. Due to the deactivating step (2), the first ligand will only couple to the still activated centre area including detection spot 35.

(4) The ligand-containing fluid is then replaced by activating fluid, and the interface is positioned such that the activating fluid covers the area that was deactivated in step (2) above (i.e., the left third of the sensing surface in FIG. 3).

(5) The activating fluid is then replaced by a fluid containing a second ligand, and the interface is positioned such that ligand-containing fluid covers the area that was activated in step (4) above. Thereby, the second ligand will be coupled to this area. The sensing surface now has the second ligand coupled to the left area that includes detection spot 34, and the first ligand to the centre area that includes detection spot 35.

(6) The ligand-containing fluid supplied through inlet 31 is then replaced by blocking fluid, and the blocking fluid supplied through inlet 32 is replaced by activating fluid. The interface is now positioned such that the activating fluid covers the right third of the sensing surface to activate that area.

(7) The activating fluid is then replaced by a fluid containing a third ligand, and the interface is maintained in the same position as in step (6) above to thereby couple the third ligand to the area that was activated in step (4) and includes detection spot 36.

(8) The activating fluid through inlet 31 is then replaced by deactivating fluid and inlet 32 is closed to deactivate all three ligand-coupled areas of the sensing surface. In this case the deactivating fluid need not be one that permits reactivation as in step (2) and must not affect the immobilised ligands, e.g., ethanolamine.

(9) The sensing surface now has three different ligands coupled thereto, i.e., the second ligand coupled to a lateral area including detection spot 34, the first ligand coupled a central area including detection spot 35, and the third ligand coupled to a lateral area including detection spot 36.

It is readily seen that ligands may readily be coupled to more than three different areas by following the above-described procedure.

An alternative immobilization procedure, which partly avoids contacting a ligand with an area or areas to which ligands have already been immobilized, and does not require reactivation of a deactivated surface, will be schematically described below with reference to FIG. 3 again.

(1) Half the sensing surface is first activated by introducing activating fluid through inlet 31 and blocking fluid through inlet 32.

(2) A first ligand is then immobilized to an inner part (i.e., adjacent to the centre) of the activated area by introducing ligand through inlet 32 and blocking fluid through inlet 31, and positioning the fluid interface in the middle of the activated area.

(3) A second ligand is then immobilized to the remaining part of the activated area (i.e., adjacent to the flow cell wall) by introducing ligand through inlet 31 and blocking fluid through inlet 32.

(4) After deactivation of the areas coupled with the first and second ligands, respectively, third and fourth ligands may then be immobilized to the other half of the sensing surface by activating this area and successively coupling the ligands, introduced through inlet 31, according to the method variant described above with reference to FIGS. 1 and 2, i.e., with intermediate deactivation of the inner area coupled with the third ligand before introducing the fourth ligand.

Alternatively, a third ligand may be coupled to the remaining part of the activated area by introducing the ligand through inlet 32.

By proceeding as described above with reference to FIG. 3, it is also possible to couple a fourth ligand without the ligand-containing fluid having to pass areas with immobilized ligands, i.e., by deactivating an outer part of the activated area (adjacent to the flow cell wall) prior to the introduction of the third ligand through inlet 32, reactivating the deactivated area after coupling of the third ligand, and subsequently introducing the fourth ligand through inlet 32 to couple the ligand to the reactivated area.

Numerous applications of a sensing surface to which multiple ligands have been immobilised at discrete areas as described above are readily apparent to a person skilled in the art and need not be detailed herein.

The invention will now be illustrated further by the following non-limiting examples.

Example 1

Immobilization of Three Different Ligands in a Y-Cell

A BIACORE® S51 instrument (Biacore AB, Uppsala, Sweden) was used. This instrument has two Y-type flow cells which allow a dual flow of fluids over a sensor chip surface, so-called hydrodynamic addressing, as described in WO 99/36766 mentioned above. The instrument uses three parallel detection spots on the sensor chip, each detection spot occupying one diode row in a diode array detector for detecting light reflected at the detection spots on the sensor chip surface. The detection spots are mutually spaced by one diode row. As sensor chip was used Sensor Chip CM5 (Biacore AB, Uppsala, Sweden) which has a gold-coated surface with a covalently linked carboxymethyl-modified dextran polymer hydrogel. Running buffer was HBS-N (10 mM HEPES pH 7.4 and 150 mM NaCl) (Biacore AB, Uppsala, Sweden). The output from the instrument is a "sensorgram" which is a plot of detector response (measured in "resonance units", RU) as a function of time. An increase of 1000 RU corresponds to an increase of mass on the sensor surface of approximately 1 ng/mm$^2$.

Antibodies anti-IL-8, anti-IL-10 and anti-IL-12 against interleukin 8 (IL-8), interleukin 10 (IL-10) and interleukin 12 (IL-12) (in-house sources, Biacore AB, Uppsala, Sweden), were diluted 10 times from stock solution with 10 mM acetate pH 4.5. They were then immobilized in the two flow cells of the instrument by the hydrodynamic addressing procedure described above with reference to FIGS. 1 and 2, using 10 minutes activation with EDC/NHS and sequential deactivation and ligand (antibody) immobilization. Each deactivation was performed with ethanolamine (100 mM, pH 8.5) for two minutes, and each antibody was injected for 7 minutes.

The different antibodies were immobilized in parallel stripes extending through the spots used for detection in the BIACORE® S51 instrument, meaning that with regard to the detector there was one diode row between each immobilized spot. However, in order to ensure that the immobilized antibodies within the detection spots were homogenous, each antibody was immobilized such that it extended into one third of the adjacent interspaces. The resulting immobilization levels in resonance units (RU) for the different ligands are shown in Tables 1 (flow cell 1) and 2 (flow cell 2) below. Bold values show targeted immobilization spots. Indicated in italics below each immobilization level value is the percentage immobilized, obtained by subtracting the baseline before injection of antibody from the baseline after subsequent deactivation with ethanolamine.

TABLE 1

| Immobilized antibody | Diode row number (flow cell 1) | | | | |
|---|---|---|---|---|---|
| | 1 | 2 | 3 | 4 | 5 |
| anti-IL-8 | 31480 | 18821 | 280 | 189 | 116 |
| | *100.0* | *46.0* | *−0.3* | *−0.5* | *−0.1* |
| anti-IL-10 | 31917 | 28574 | 26629 | 18645 | 62 |
| | *−14.4* | *32.2* | *100.0* | *47.7* | *−0.1* |
| anti-IL-12 | 23892 | 14945 | 13037 | 9904 | 15611 |
| | *−6.1* | *−20.3* | *−13.2* | *21.2* | *100.0* |

TABLE 2

| Immobilized antibody | Diode row number (flow cell 2) | | | | |
|---|---|---|---|---|---|
| | 1 | 2 | 3 | 4 | 5 |
| anti-IL-8 | 123 | 152 | 147 | 20214 | 30138 |
| | *−0.1* | *−0.3* | *−0.2* | *49.6* | *100.0* |
| anti-IL-10 | 98 | 17142 | 26016 | 27174 | 30496 |
| | *0.1* | *49.3* | *100.0* | *20.6* | *−13.0* |
| anti-IL-12 | 16013 | 9407 | 13525 | 13877 | 23681 |
| | *100.0* | *14.5* | *−8.7* | *−18.8* | *−12.0* |

As shown in the tables, selective repeatable immobilization of ligands at the desired detection spots was obtained with no or very low "cross-talk" between spots.

The corresponding antigens IL-8, IL-10 and IL-12 were diluted to 500 ng/ml in HBS-N (Biacore AB, Uppsala, Sweden) and sequentially injected for 4 minutes in both flow cells. Between injections, the surfaces were regenerated with 0.1 trifluoroacetic acid (TFA) for 6 seconds. The resulting binding levels (in RU) are shown in Tables 3 and 4 below. Below each binding value, calculated percent cross-talk is indicated in italics.

TABLE 3

| Analyte antigen | Diode row number (flow cell 1) | | | | |
|---|---|---|---|---|---|
| | 1 | 2 | 3 | 4 | 5 |
| IL-8 | 1611 | 776 | 25 | 14 | 2 |
| | *100.0* | *48.2* | *1.5* | *0.9* | *0.1* |
| IL-10 | 2 | 287 | 484 | 6 | −1 |
| | *0.5* | *59.4* | *100.0* | *1.3* | *−0.3* |
| IL-12 | 1 | 4 | 8 | 450 | 1076 |
| | *0.1* | *0.4* | *0.8* | *41.8* | *100.0* |

TABLE 4

| Analyte antigen | Diode row number (flow cell 2) | | | | |
|---|---|---|---|---|---|
| | 1 | 2 | 3 | 4 | 5 |
| IL-8 | 4 | 16 | 26 | 730 | 1451 |
| | *0.3* | *1.1* | *1.8* | *50.3* | *100.0* |
| IL-10 | −3 | 8 | 328 | 272 | 1 |
| | *−0.9* | *2.5* | *100.0* | *83.1* | *0.3* |
| IL-12 | 1183 | 396 | 7 | 2 | −2 |
| | *100.0* | *33.4* | *0.6* | *0.2* | *−0.2* |

As shown in the tables above, cross-talk between spots was below 1%, except for IL-8 which bound by 1.5% and 1.8%, respectively, to the anti-IL-10 antibody, most likely due to cross-reactivity.

Example 2

Immobilization of Five Different Ligands in a Y-Cell

Following the procedure in Example 1 and using the same instrument and sensor chip, five different ligands were immobilized in a Y-cell. In this case, however, each ligand spot adjoined to the next one without any separating detector diode row. The interfaces between the spots were adjusted to obtain a 5% theoretical cross-talk to ensure homogeneity of the spots. The following ligands were sequentially immobilized: anti-IL-8, anti-myoglobin, anti-IL-10, anti-CKMB and anti-IL-12 (all from in-house sources, Biacore AB, Uppsala, Sweden). The resulting immobilization levels for flow cell 1, as well as the percentages cross-talk (in italics), are shown in Table 5 below.

TABLE 5

| Immobilized antibody | Diode row number (flow cell 2) | | | | |
|---|---|---|---|---|---|
| | 1 | 2 | 3 | 4 | 5 |
| anti-IL-8 | 27550 | 910 | 253 | 180 | 127 |
| | | *3* | *1* | *1* | *0* |
| anti-myoglobin | 32199 | 29280 | 1149 | 182 | 138 |
| | | | *3* | *0* | *0* |

TABLE 5-continued

| Immobilized antibody | Diode row number (flow cell 2) | | | | |
|---|---|---|---|---|---|
| | 1 | 2 | 3 | 4 | 5 |
| anti-IL-10 | 29762 | 26385 | 24325 | 1024 4 | 123 0 |
| anti-IL-12 | 22680 1 | 15940 0 | 12330 0 | 1763 −2 | 24848 1 |
| anti-CKMB | 22769 0 | 16003 0 | 12690 2 | 19940 0 | 26576 0 |

As appears from the table above, all the antibody immobilizations were successful, the maximum cross-talk obtained being 4%.

The antigens corresponding to the immobilized antibodies were then injected as described in Example 1, except that myoglobin and CKMB were each diluted to 5 µg/ml in HBS-N. The resulting binding level for each analyte in percent of that for the "active" spot (after subtraction of the average for buffer samples) are presented in Table 6 below.

TABLE 6

| Analyte antigen | Diode row number (flow cell 2) | | | | |
|---|---|---|---|---|---|
| | 1 | 2 | 3 | 4 | 5 |
| myoglobin | 2.9 | 100.0 | 9.3 | 0.5 | 0.0 |
| CKMB | −2.4 | −2.5 | 0.5 | 100.0 | 3.7 |
| IL-8 | 100.0 | 3.9 | 1.8 | 1.0 | −0.1 |
| IL-10 | −2.6 | −2.2 | 100.0 | −0.3 | −2.8 |
| IL-12 | −0.4 | −0.4 | 1.5 | 3.1 | 100.0 |

As shown in the table above, the maximum cross-talk was below 10%.

It is to be understood that the invention is not limited to the particular embodiments of the invention described above, but the scope of the invention will be established by the appended claims.

The invention claimed is:

1. A method of coupling at least three different binding agents to respective defined areas of a substrate surface that is provided in a Y-shaped flow cell, for subsequent analysis to detect interaction between said binding agents and one or more analytes, by hydrodynamic addressing based on two laminar fluid flows that flow together in the same direction over the substrate surface with an interface to each other, and selectively contacting a defined area of the substrate surface with a desired fluid by positioning the interface laterally through adjustment of the relative flow rates of the two fluid flows, which method comprises coupling at least two of said binding agents to respective defined areas of the substrate surface by at least one of hydrodynamic addressing procedures A and B, wherein:

procedure A comprises immobilizing a first binding agent to a first area of the substrate surface by contacting the area with a fluid containing the first binding agent, deactivating the first area by subjecting the area to a deactivating fluid, immobilizing a second binding agent to a second area of the substrate surface by contacting a substrate surface area including the first and second areas with the second binding agent, deactivating at least a portion of the first and second areas by subjecting the first and second areas to the deactivating fluid, and immobilizing a third binding agent to a third area of the substrate surface by contacting a substrate surface area including the first, second, and third areas with the third binding agent; and procedure B comprises deactivating a first area of the substrate surface by subjecting the area to a deactivating fluid, immobilizing a first binding agent to a second area of the substrate surface by contacting the first and second areas with a fluid containing the first binding agent, activating at least a part of the first area by subjecting the area to an activating fluid, immobilizing a second binding agent to the first area by contacting the area with a fluid containing the second binding agent, deactivating at least a portion of the first and second areas by subjecting the first and second areas to the deactivating fluid, activating a portion of a third area of the substrate surface by subjecting the third area to the activating fluid, and immobilizing a third binding agent to a third area of the substrate surface by contacting the third area of the substrate surface with the third binding agent, wherein the first, the second and the third binding agents are different from each other.

2. The method according to claim 1, wherein procedure A comprises the steps of:

a) providing a substrate surface, at least part of which is reactive to permit coupling of binding agents thereto;

b) passing over the substrate surface a laminar flow of a fluid containing a first binding agent, and adjacent thereto a laminar flow of a blocking fluid that does not interact with the substrate surface, such that the two fluids flow together in the same direction with an interface to each other, and adjusting the relative flow rates of the two laminar fluid flows to position the interface such that the first binding agent-containing fluid selectively contacts a first reactive area of the substrate surface to couple the first binding agent thereto;

c) replacing the flow of the first binding agent-containing fluid with a laminar flow of a deactivating fluid, and positioning the interface laterally such that the deactivating fluid selectively contacts at least the first binding agent-coupled area but less than the whole reactive surface area for deactivation thereof;

d) replacing the flow of the deactivating fluid with a laminar flow of a fluid containing the second binding agent, and positioning the interface laterally such that the second binding agent-containing fluid selectively contacts the deactivated area and an adjacent second reactive area of the substrate surface to selectively couple the second binding agent to the second area;

e) replacing the flow of the second binding agent-containing fluid with a laminar flow of the deactivating fluid, and positioning the interface laterally such that the deactivating fluid selectively contacts at least the first or second binding agent-coupled area but less than the whole reactive surface area for deactivation thereof; and f) replacing the flow of the deactivating fluid with a laminar flow of a fluid containing the third binding agent, and positioning the interface laterally such that the third binding agent-containing fluid selectively contacts the deactivated area and an adjacent third reactive area of the substrate surface to selectively couple the third binding agent to the third area.

3. The method according to claim 2, which additionally comprises the step of:

g) replacing the flow of the third binding agent-containing fluid with a laminar flow of deactivating fluid, and positioning the interface laterally such that the deactivating fluid selectively contacts at least the deactivated area and the third binding agent-coupled area of the substrate surface for deactivation thereof.

4. The method according to claim 3, further comprising coupling at least one additional binding agent to a respective reactive area on the substrate surface.

5. The method according to claim 1, wherein procedure B comprises the steps of:
a) providing a substrate surface, at least part of which is reactive to permit coupling of binding agents thereto;
b) passing over the substrate surface a laminar flow of a deactivating fluid, and adjacent thereto a laminar flow of a blocking fluid that does not interact with the substrate surface, such that the two fluids flow together in the same direction with an interface to each other, and adjusting the relative flow rates of the two laminar fluid flows to position the interface such that the deactivating fluid selectively contacts a first reactive area of the substrate surface for deactivation thereof;
c) replacing the flow of the deactivating fluid with a laminar flow of a fluid containing a first binding agent, and positioning the interface laterally such that the first binding agent-containing fluid selectively contacts the deactivated area and an adjacent second reactive area of the substrate surface to selectively couple the first binding agent to the second area;
d) replacing the flow of the first binding agent-containing fluid with a laminar flow of activating fluid, and positioning the interface laterally such that the activating fluid selectively contacts at least a part of the deactivated first area for activation thereof;
e) replacing the flow of the activating fluid with a laminar flow of a fluid containing a second binding agent, and positioning the interface laterally such that the second binding agent-containing fluid selectively contacts the activated first area to selectively couple the second binding agent thereto;
f) replacing the flow of the second binding agent-containing fluid with a laminar flow of the deactivating fluid, and positioning the interface laterally such that the deactivating fluid selectively contacts at least the first or second binding agent-coupled area but less than the whole reactive surface area for deactivation thereof;
g) replacing the flow of the deactivating fluid with a laminar flow of activating fluid, and positioning the interface laterally such that the activating fluid selectively contacts a third area of the substrate surface;
h) replacing the flow of the activating fluid with a laminar flow of the deactivating fluid and positioning the interface laterally such that the deactivating fluid selectively contacts only a portion of the third area of the substrate surface; and
i) replacing the flow of the deactivating fluid with a laminar flow of a fluid containing the third binding agent, and positioning the interface laterally such that the third binding agent-containing fluid selectively contacts the deactivated area and an adjacent third reactive area of the substrate surface to selectively couple the third binding agent to the third reactive area.

6. The method according to claim 5, further comprising coupling at least one additional binding agent to a respective reactive area on the substrate surface.

7. The method according to claim 1, wherein at least one of the reactive areas of the substrate surface comprises activated functional groups.

8. The method according to claim 2, wherein step a) comprises passing a laminar flow of activating fluid over at least a part of the substrate surface to provide the at least partly reactive surface.

9. The method according to claim 5, wherein step a) comprises passing a laminar flow of activating fluid over at least a part of the substrate surface to provide the at least partly reactive surface.

10. The method according to claim 2, wherein step a) comprises providing a surface with pre-activated functional groups.

11. The method according to claim 5, wherein step a) comprises providing a surface with pre-activated functional groups.

12. The method according to claim 1, wherein at least one of the reactive areas of the substrate surface comprises functional groups capable of reacting with the binding agents without activation of the functional groups.

13. The method according to claim 2, which comprises the step of, prior to performing step b), passing over the substrate surface a laminar flow of deactivating fluid and an adjacent laminar flow of blocking fluid, and positioning the interface such that the deactivating fluid selectively contacts a reactive edge area of the substrate surface adjacent to the first area to be contacted with binding agent in step b) for deactivation thereof.

14. The method according to claim 2, which comprises performing steps b) to f) in the opposite lateral direction to the flow path to couple at least one additional binding agent to a respective reactive area of the substrate surface.

15. The method according to claim 14, which comprises activating an additional part of the substrate surface prior to performing steps b) to f) of claim 2 in the opposite lateral direction to the flow path.

16. The method according to claim 3, wherein in steps c) and e) the laminar flow of deactivating fluid is adjusted to contact also a reactive area adjacent to the binding agent-coupled area to provide a non-coupled area between neighbouring binding agent-coupled areas.

17. The method according to claim 3, which further comprises coupling a fourth binding agent to a remaining activated area adjacent to the third area after coupling of the third binding agent.

18. The method according to claim 5, which further comprises deactivating a part of the surface portion activated in step g), and after coupling the third binding agent in step i), reactivating the deactivated area and coupling a fourth binding agent thereto.

19. The method according to claim 1, wherein the substrate surface is a sensing surface of a sensor.

20. The method of claim 1, wherein a system comprising:
a flow cell having an inlet end and an outlet end, at least one sensing surface on a wall surface within the flow cell located between the inlet and outlet ends, wherein the flow cell has at least two inlet openings at the inlet end and at least one outlet opening at the outlet end, such that separate laminar flows entering the flow cell through the respective inlet openings can flow side by side in the same direction through the flow cell over the sensing surface, means for applying laminar flows through the inlet openings, such that the laminar flows pass side by side through the flow cell over the sensing surface with an interface to each other that is parallel to the direction of the laminar flows; and
means for varying the relative flow rates of the laminar fluids to displace laterally the interface over the sensing surface; is used for performing the method.

* * * * *